United States Patent
Paukert et al.

[11] 3,743,388
[45] July 3, 1973

[54] REPRODUCTION OBJECTIVE FORMED OF FIVE LENSES

[75] Inventors: Miloslav Paukert; Jan Skopal, both of Prerov, Czechoslovakia

[73] Assignee: Meopta, narodni podnik, Prerov, Czechoslovakia

[22] Filed: Dec. 21, 1971

[21] Appl. No.: 210,417

[30] Foreign Application Priority Data
Dec. 27, 1970 Czechoslovakia ................. 8785/70

[52] U.S. Cl. ................................. 350/220, 350/227
[51] Int. Cl. ......................... G02b 9/26, G02b 9/34
[58] Field of Search ......................... 350/220, 227

[56] References Cited
UNITED STATES PATENTS
2,764,062  9/1956  Lange ............................... 350/227
2,336,301  12/1943  Schade et al. ...................... 350/227
2,446,402  8/1948  Aklin ................................ 350/220

Primary Examiner—John K. Corbin
Attorney—Murray Schaffer et al.

[57] ABSTRACT

Reproduction objective or lens system, especially suitable for image reproduction in copying machines of a magnification ratio of 1:1, formed by five lenses, axially arranged in such a way that the first lens, nearest to the object plane, is a meniscus lens of negative refractive power and the second lens is a meniscus lens of positive refractive power. Both lenses are either cemented together into one optical member or separated by an air gap, all their refractive surfaces being turned away from said object plane. The next lens is a biconcave lens and the following two lenses are cemented together into one optical member, the first lens of this member being biconcave and the second one biconvex.

2 Claims, 2 Drawing Figures

PATENTED JUL 3 1973

3,743,388

MILOSLAV PAUKERT
JAN SKOPAL
INVENTORS

REPRODUCTION OBJECTIVE FORMED OF FIVE LENSES

BACKGROUND OF INVENTION

The present invention relates to optical lens systems and particularly to a reproduction objective, especially suitable for use in xerographic or similar copying machines where image reproduction at a magnification ratio of about 1:1 is required.

Objectives are well known and used widely for reproduction and magnification purposes as well as for cameras and projectors. Usually, only the first member of the optical system of these objectives has positive refractive power and comprises a simple positive lens or a cemented lens. The corrective state of objectives designed for copy reproduction purposes is such that only with respect to the focal length and to the format or overall size of the original can it be successfully used. The magnification ratio of reproduction objectives, for such original copy workpieces for example, having the format of 13 × 18 mm at a focal length of 35 mm, is limited to the range of 2 × (times) to 6 × (times) only, where the optimum acuity of the image, conditioned by the corrective state, is only at the average magnification, which in this case is at a magnification of only 4 ×. At extreme magnifications within the overall range, i.e. for a magnification of 2 × and 6 × respectively, the quality of the reproduced image becomes considerably worse and when magnification exceeds these extremes, the acuity tends to be insufficient. This is especially evident at small magnifications. Consequently, these objectives cannot be successfully used for low magnifications at for example, 1 ×.

An analogous situation results also from the distribution of light in the image plane. At average magnifications, i.e. of 4 ×, the geometric or peripheral vignetting generally does not exceed 40 percent, while, at higher magnifications it increases to over 50 percent. Such light distribution, as a rule, is not acceptable. Analogously to the corrective state, the geometrical vignetting for a magnification of 1 × is also still relatively high. Thus, for demanding an accurate reproduction objectives of the prior art are unacceptable for the magnification of about 1:1.

An object of the present invention is to provide a reproduction objective which would at a magnification ratio of 1 × secure good acuity of the image over the whole range of the field of view, and which would practically remove the distortion of the image while maintaining the geometric vignetting of the objective in the corners of the format below or not exceeding 20 percent.

It is another object to provide a reproduction objective, satisfying the above criteria which is simple in structure, does not exceed the number of lenses in normal systems and uses the customary types of optical glasses.

SUMMARY OF INVENTION

According to the present invention a reproduction objective, especially suitable for the reproduction of images at a magnification ratio of about 1 ×, is formed by five lenses axially arranged. The first lens, nearest to the object plane, is a meniscus lens of negative refractive power and the second lens is a meniscus lens of positive refractive power. The first two lenses being either cemented together into one optical member or separated by an air gap, with all their refractive surfaces being turned away from said object plane. The next lens is a biconcave lens and the following two lenses are cemented together into one optical member, the first lens of this member being biconcave and the second one biconvex.

It is preferred that the focal length of the last two lenses, the combined cemented optical member be greater than the absolute value of the focal length of the third and second lens, but smaller than the absolute value of the focal length of the first lens. The radius of curvature of the cemented refractive surface should be greater than the radius of curvature of the second refractive surface of the first lens and smaller than the radius of curvature of the second refractive surface of the third lens. The absolute value of the last radius of curvature of the system should be greater than the radius of curvature of the first refractive surface of the second lens, but smaller than the absolute value of the radius of curvature of the first refractive surface of the third lens. The total of the thicknesses of the second and fifth lens should be greater than the total of all axial air gaps between the individual lenses and the axial thickness of the second lens should be greater than the total of thicknesses of all remaining negative lenses.

Through suitable choice of the focal lengths of the individual lenses of the optical system, of the radii of curvature of the individual refractive surfaces as well as through adjustment of the axial thicknesses and of the air gaps, the geometrical vignetting of the solved objective at satisfactory residual aberration for a magnification of 1 × and at a lens speed 1:5, 6 is practically zero.

Full details of the present invention are set forth in the following description and illustrated in the accompanying drawings.

DESCRIPTION OF THE INVENTION

Figure 1:
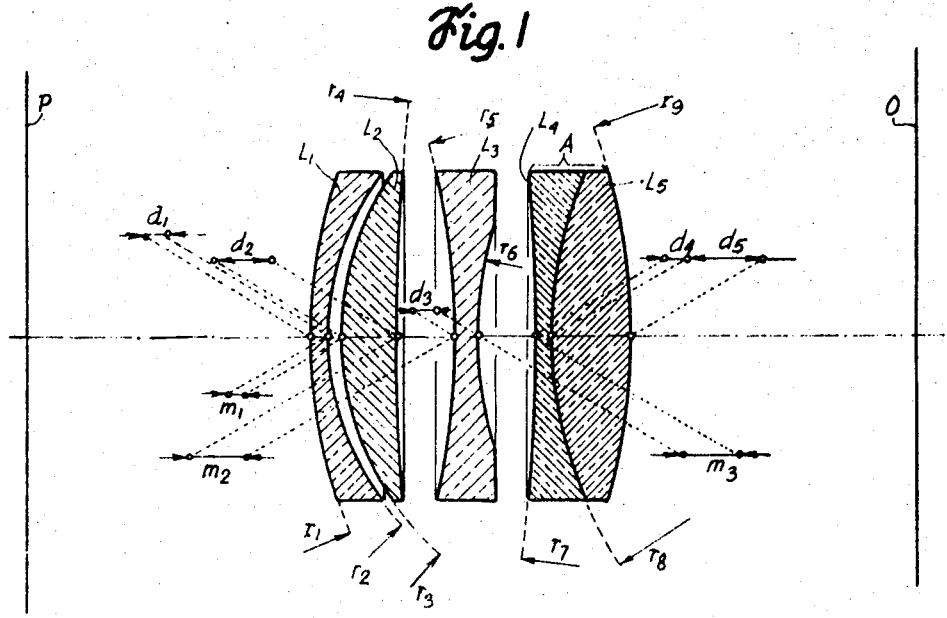
FIG. 1 is a schematic cross sectional view of a lens system formed according to the present invention.
Figure 2:
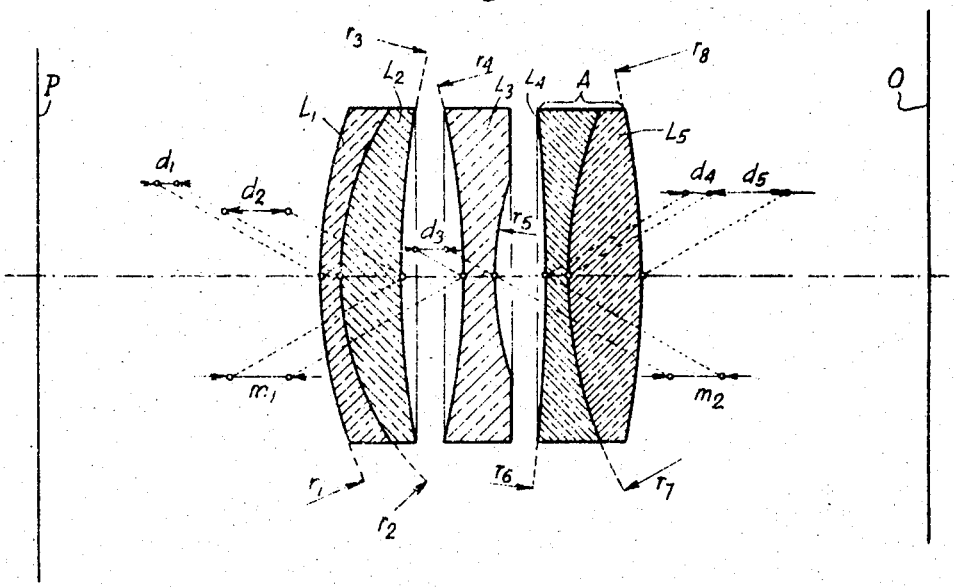
FIG. 2 is a similar view of a modified version of the system.

As is obvious from FIG. 1, the reproduction objective consists of five lenses, all lenses being separate except for the two last ones, which are cemented together into one optical member defined generally, by the letter A. The values of the radii of curvature of the adjacent refractive surfaces of the first and second lens are the same or differ only slightly from each other. The said first two lenses can be cemented together into one optical member, as illustrated in the embodiment, FIG. 2. The individual lenses of the system are designated by the numerals $L_1$ through $L_5$, the cemented optical member by A, the radii of curvature of the individual refractive surfaces by $r_1$ through $r_9$, the thicknesses of the individual lenses by $d_1$ through $d_5$, the air gaps between the individual optical members by $m_1$ through $m_3$. The letter P designates the object plane and O the image plane. The thicknesses and gaps are indicated in millimeters, the indicated values being measured on the optical axis. The system as seen in either figure is formed by five lenses, axially arranged and held in a housing or tube in conventional manner. The lens $L_1$ nearest to the object plane, is a meniscus lens of negative refractive power. The second lens $L_2$ is a meniscus lens of positive refractive power. The refractive surfaces $r_1$, $r_2$, and $r_3$ being turned away or convex from the object plane. The next lens $L_3$ is a biconcave lens and the following two lenses $L_4$ and $L_5$ are cemented together into the optical member A. The first lens $L_4$ of this member A being biconcave while the second one $L_5$ is biconvex.

The following tables contain in numerical expression two examples by which the reproduction objective of the present invention is obtained, where the focal length is converted to a focal length of $f = 100$ mm, the relative aperture of the objective being 1:5, 6.

Example 1 indicates a system of the reproduction objective, in which the first two lenses $L_1$ and $L_2$ are separated from each other by an air gap. Example 2 illustrates a system, in which the above two lenses $L_1$ and $L_2$ are cemented together into one optical member.

Example 1:

| | $d, m$ | $n_d$ | $\nu$ |
|---|---|---|---|
| $r_1 = + 34,246$ | | | |
| | $d_1 = 1,36$ | 1,59551 | 39,2 |
| $r_2 = + 19,257$ | | | |
| | $m_1 = 0,15$ | air | |
| $r_3 = + 19,257$ | | | |
| | $d_2 = 4,49$ | 1,65844 | 50,8 |
| $r_4 = + 1 837,15$ | | | |
| | $m_2 = 3,75$ | air | |
| $r_5 = - 48,439$ | | | |
| | $d_3 = 1,47$ | 1,57845 | 41,7 |
| $r_6 = + 29,478$ | | | |
| | $m_3 = 3,9$ | air | |
| $r_7 = - 144,764$ | | | |
| | $d_4 = 1,25$ | 1,54869 | 45,4 |
| $r_8 = + 27,948$ | | | |
| | $d_5 = 5,15$ | 1,65844 | 50,8 |
| $r_9 = - 36,259$ | | | | where
$f_{L_1} = - 76,4714$
$f_{L_2} = + 29,5273$
$f_{L_3} = - 31,4932$
$f_A = + 54,4804$ Example 2:

| | $d, m$ | $n_d$ | $\nu$ |
|---|---|---|---|
| $r_1 = + 33,769$ | | | |
| | $d_1 = 1,10$ | 1,59551 | 39,2 |
| $r_2 = + 19,080$ | | | |
| | $d_2 = 4,41$ | 1,65844 | 50,8 |
| $r_3 = + 1014,67$ | | | |
| | $m_1 = 3,68$ | air | |
| $r_4 = - 48,439$ | | | |
| | $d_3 = 1,47$ | 1,57845 | 41,7 |
| $r_5 = + 29,478$ | | | |
| | $m_2 = 4,23$ | air | |
| $r_6 = - 144,764$ | | | |
| | $d_4 = 1,25$ | 1,54869 | 45,4 |
| $r_7 = + 27,948$ | | | |
| | $d_5 = 5,15$ | 1,65844 | 50,8 |
| $r_8 = - 36,259$ | | | | where
$f_{L_1} = - 75,7752$
$f_{L_2} = + 29,4811$
$f_{L_3} = - 31,4932$
$f_A = + 54,4804$ In the examples $r_1$ through $r_8$ and/or $r_9$ designate the radii of curvature of refractive surfaces, $d_1$ through $d_5$ the axial thicknesses of the individual lenses, $m_1$, $m_2$ and/or $m_3$ the air gaps between the individual optical members, $n_d$ designates the refractive index for spectral line $d$ and $\nu$ the Abbe number.

The reproduction objectives formed according to the examples are suitable for image reproduction at a magnification of 1 X. The distortion of the images is fully removed and the residual aberrations significantly reduced. Geometrical vignetting is reduced to practically zero, securing a uniform distribution of the light over the whole image format. For these reasons the resultant objective is especially suitable for xerographic reproduction devices.

As seen from the foregoing a lens system according to the present invention satisfies the conditions $f_{L_2} < |f_{L_3}| < f_A < |f_{L_1}|$ where $f_{L_1}$, $f_{L_2}$ and $f_{L_3}$ are the focal lengths of the first, second and third lenses and $f_A$ is the focal length of the cemented member consisting of lenses $L_4$ and $L_5$.

Further, the lens system of this invention may be characterized by the fact the radius of curvature of the cemented refractive surface of the optical member A is greater than the radius of curvature of the second refractive surface of the first lens $L_1$ and smaller than the radius of curvature of the second refractive surface of the third lens $L_3$ and the absolute value of the last radius of curvature of the system is greater than the radius of curvature of the first refractive surface of the second lens $L_2$, but smaller than the absolute value of the radius of curvature of the first refractive surface of the third lens $L_3$.

Still further, from the foregoing examples it will be seen that the lens system may also be characterized by the fact that the total of the thicknesses of the second lens $L_2$ and of the fifth lens $L_5$ is greater than the total of all axial air gaps between the individual lenses and that the axial thickness of the second lens $L_2$ is greater than the total of thicknesses of all remaining negative lenses.

It will be seen from the foregoing that the reproduction lens system can be formed with a number of modifications and in a number of sizes, refractive ranges and focal lengths. The foregoing is illustrative and should not be taken as limiting of the scope of the invention.

What is claimed is:

1. A reproduction objective, especially suitable for image reproduction of a magnification ratio of 1:1, comprising five lenses, along a common axis with respect to the object plane and the image plane, the first lens, nearest to the object plane, being a meniscus lens of negative refractive power, the second lens being a meniscus lens of positive refractive power, all their refractive surfaces being turned away from said object plane, the third lens being a biconcave lens and the fourth and fifth lenses being cemented together into one optical member, the first lens of this optical member being biconcave and the second one biconvex, wherein

| | $d, m$ | $n_d$ | $\nu$ |
|---|---|---|---|
| $r_1 = + 34,245$ | | | |
| | $d_1 = 1,36$ | 1,59551 | 39,2 |
| $r_2 = + 19,257$ | | | |
| | $m_1 = 0,15$ | air | |
| $r_3 = + 19,257$ | | | |
| | $d_2 = 4,49$ | 1,65884 | 50,8 |
| $r_4 = +1837,15$ | | | |
| | $m_2 = 3,75$ | air | |
| $r_5 = - 48,439$ | | | |
| | $d_3 = 1,47$ | 1,57845 | 41,7 |
| $r_6 = + 29,478$ | | | |
| | $m_3 = 3,9$ | air | |
| $r_7 = - 144,764$ | | | |
| | $d_4 = 1,25$ | 1,54869 | 45,4 |
| $r_8 = + 27,948$ | | | |
| | $d_5 = 5,15$ | 1,65844 | 50,8 |
| $r_9 = - 36,259$ | | | | where $r_1$ through $r_9$ designate the radii of curvature, $d_1$ through $d_5$ the axial thicknesses of the individual lenses, $m_1$ through $m_3$ the air gaps between the individual members, $n_d$ the refractive index for spectral line $d$ and $\nu$ the Abbe number.

2. A reproduction objective, especially suitable for image reproduction of a magnification ratio of 1 : 1, comprising five lenses, along a common axis with respect to the object plane and the image plane, the first two lenses being cemented together into one optical member, the third lens being a biconcave lens, and the fourth and fifth lenses being cemented together into one optical member, wherein

| | $d, m$ | $n_d$ | $\nu$ |
|---|---|---|---|
| $r_1 = +33{,}769$ | $d_1 = 1{,}1$ | 1,59551 | 39,2 |
| $r_2 = +19{,}080$ | $d_2 = 4{,}41$ | 1,65844 | 50,8 |
| $r_3 = +1014{,}67$ | $m_1 = 3{,}68$ | air | |
| $r_4 = -48{,}439$ | $d_3 = 1{,}47$ | 1,57845 | 41,7 |
| $r_5 = +29{,}478$ | $m_2 = 4{,}23$ | air | |
| $r_6 = -144{,}764$ | $d_4 = 1{,}25$ | 1,54869 | 45,4 |
| $r_7 = +27{,}948$ | $d_5 = 5{,}15$ | 1,65844 | 50,8 |
| $r_8 = -36{,}259$ | | | | where $r_1$ through $r_8$ designate the radii of curvature, $d_1$ through $d_5$ the axial thicknesses of the individual lenses, $m_1$ through $m_2$ the air gaps between the individual members, $n_d$ the refractive index for spectral line $d$ and $\nu$ the Abbe number.

* * * * *